US005388200A

United States Patent [19]

McDonald et al.

[11] Patent Number: 5,388,200

[45] Date of Patent: Feb. 7, 1995

[54] METHOD AND APPARATUS FOR WRITING DIRECTLY TO A FRAME BUFFER

[75] Inventors: John F. McDonald, Leominster; Steven E. Golson, Carlisle, both of Mass.; Edward H. Frank, Portola Valley, Calif.

[73] Assignee: Sun Microsystems, Inc., Mountain View, Calif.

[21] Appl. No.: 632,015

[22] Filed: Dec. 21, 1990

[51] Int. Cl.[6] .............. G06F 15/62

[52] U.S. Cl. .............. 395/157; 395/164

[58] Field of Search .............. 395/152, 162, 163, 164, 395/165, 166, 116, 155–161; 345/113, 119, 122, 185–195, 198, 200

[56] References Cited

U.S. PATENT DOCUMENTS 5,119,494 6/1992 Garman .............. 395/700

FOREIGN PATENT DOCUMENTS 0140128 9/1984 European Pat. Off. .
0384419 2/1990 European Pat. Off. .
2180729 4/1987 United Kingdom .............. 395/152

OTHER PUBLICATIONS

"*Use of a Coprocessor for Emulating the PC AT*", John W. Irwin, *IBM RT Personal Computer Technology*, pp. 137-141, 1986.

"*Coprocessor Software Support*", Rajan Krishnamurty and Terry Mothersole, *IBM RT Personal Computer Technology*, pp. 142–146, 1986.

*Primary Examiner*—Mark R. Powell
*Assistant Examiner*—Huynh Ba
*Attorney, Agent, or Firm*—Blakely Sokoloff Taylor & Zafman

[57] ABSTRACT

A method is provided for writing directly to a frame buffer which provides signals to an output display of a computer system. The computer system has a first processor running a window management program controlling the furnishing of data in a first format to the frame buffer, and a second processor running application programs in a second format for display. A signal is provided from the second processor to the window management program indicating that an application program running on the second processor has information to be displayed. Then a window is set up for the display of the application program running on the second processor under control of the window management program. The second processor is signaled that the window exists and provided information regarding the position and clipping of the window. A data structure is set up for the window including a frame buffer address and clipping information for each address to be generated for displaying the application program running on the second processor in the window constructed. Data is transferred from the application program running on the second processor to the addresses in the frame buffer pointed to by the addresses in the data structure.

26 Claims, 3 Drawing Sheets

METHOD AND APPARATUS FOR WRITING DIRECTLY TO A FRAME BUFFER

BACKGROUND OF THE INVENTION

1. Field of the Invention

This invention relates to multitasking computer systems having windowing programs controlling access to the frame buffer and, more particularly, to methods and apparatus for writing directly to the frame buffer in such a system.

2. History of the Prior Art

In its simplest form, a computer writes information from a single program to a frame buffer which stores the information so that it may be written to an output display. Usually, the display of this single program covers the entire output display. When it is desired to display more than one program at a time on an output display, each program is presented in a small portion of the display called a window (usually a rectangle). When a number of different programs are running on a computer system, a number of windows will appear on the screen of the output display. These windows may be moved about, may be changed in size (and sometimes in shape), and may often overlap one another. When one window overlaps another window in which a program is running, data must not be written to the portion of the window which is overlapped and in the background; that data must be clipped so that data in the foreground is not overwritten.

It is necessary, among other things, when running application programs in a plurality of windows to somehow set up the different windows into which each program is to fit, to direct the information from each application program to the correct window, and to take care of the overlapping of different windows so that the correct portions of each program are displayed.

If all of these tasks are done by the individual application programs, then there must be a great deal of checking among the programs to make sure that the different programs do not interfere with one another. This tends to slow the operation of the system and allows poorly designed software to distort the operation of the system. For this reason, more advanced computer systems have designed window management programs which take over the entire operation of writing to the frame buffer to control what is displayed.

A window management program controls the entire display, sets up the windows into which different programs may be written, controls the positioning of those windows, determines which information is displayed when windows overlap, and does all of the operations necessary to allow the simultaneous display of a number of application programs on a single output display device. When a program operating through a window management program desires to present information on the output display, it signals the window management program. The window management program assigns to it a particular portion of the display and sets up the window in which the program is to be displayed. Then, typically, as each pixel of information is furnished by the application program for presentation, the window management program determines the position on the screen at which that pixel is to appear, checks to see whether the pixel is obscured by some other window, and furnishes the results of the computation to the frame buffer for display on the output display. The window management program controls the positioning and repositioning of windows and any problems caused by overlapping. This guarantees that programs operate correctly in presenting their displays and relieves a programmer of the necessity of writing most of the procedures required for display purposes.

In such a system, only by going through the window management program can a program have its results displayed. Normally this is desirable because the window management program does all of the housekeeping which is necessary for a windows display and keeps the different programs from overwriting one another and otherwise interfering with each other on the display. However, such a method of presenting information has a significant overhead so that the frame buffer from which data is actually written to the display can be updated only about ten times a second. A computer system running such a windows management program does not update the frame buffer as rapidly as do individual programs in a system without a windows management program.

Many individual computer programs provide more satisfactory performance when the frame buffer is updated more rapidly than is possible using a windows management program. For example, live video such as television and animation programs require updating at a much faster rate than ten times a second. In general, thirty frames of video information are presented every second. If this information is to be presented in a window on an output display controlled by a window management program in which the frame buffer can only be updated ten times per second, the video picture which is presented will be distorted. It may appear to jump from one frame to the next, and frame tears may occur in which parts of different video frames appear on the display at once.

One way to present rapidly changing graphics information which is not distorted in a system using a window management program to control the display would be to bypass the window management program and write directly to the frame buffer. However, doing so creates all of the problems which a window management program was devised to solve. If an application program writes directly to the display, it may overwrite other programs or interfere in other ways with those other programs or may itself be overwritten by the window management program. Moreover, such a program must somehow overcome the delay caused by all of the cross-checking necessary to allow its existence with programs controlled by the window management program.

SUMMARY OF THE INVENTION

It is, therefore, an object of the present invention to provide a method and apparatus for allowing a program running in a system having a window management program to write directly to a frame buffer.

It is another more specific object of the present invention to provide a method and apparatus for allowing a program running in a system having a window management program to write directly to a frame buffer without interfering with the other programs controlled by the window management program or having its presentation interfered with by other programs.

These and other objects of the present invention are realized in a method for writing directly to a frame buffer providing signals to an output display in a computer system having a processor running a window management program controlling the furnishing of data to the frame buffer, and a second source of graphics information to be displayed comprising the steps of providing a signal from the second source to the window management program indicating that the second source has graphics information to be displayed, setting up under control of the window management program a window for the display of the graphics information to be furnished by the second source, signalling the second source that the window exists and providing information regarding its position and clipping, setting up a data structure for the window including a frame buffer address and clipping information for each address to be generated for displaying the graphics information provided by the second source in the window constructed, and transferring the graphics information from the second source to addresses in the frame buffer pointed to by the addresses in the data structure.

These and other objects and features of the invention will be better understood by reference to the detailed description which follows taken together with the drawings in which like elements are referred to by like designations throughout the several views.

NOTATION AND NOMENCLATURE

Figure 1:
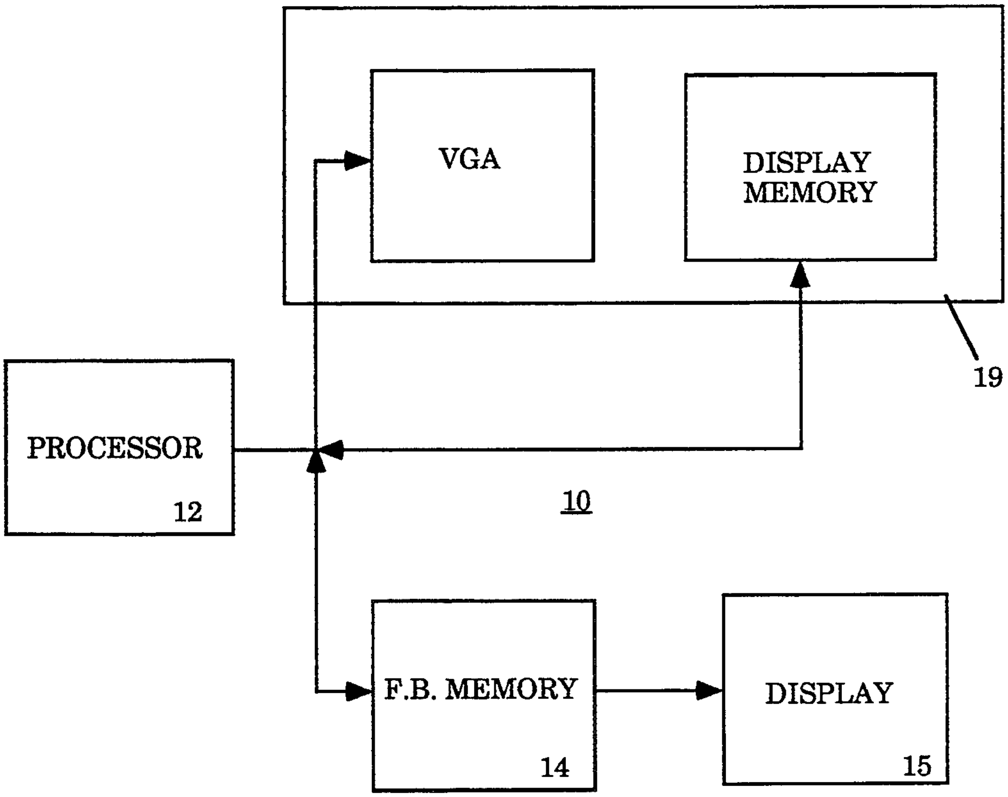
Figure 1 Prior Art
FIG. 1 is a block diagram of a prior art computer system utilizing a window management program.

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. The operations of the present invention are usually performed by general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Typically a window management program receives a signal indicating that an application program desires to present information on a computer output display. Of course, it is not necessary that the information to be presented be received from an application program. Live video or animation might be presented by other sources of information such as a source of television signals providing information to a frame grabber. In all of these cases, the window management program selects a particular portion of the display and sets up the window in which the information from the program or other source (all of which are referred to hereinafter as application programs) will be displayed. It then notifies the source and waits to receive the data.

Each piece of data which is to be presented in the window on the display has an address at which the data is to be furnished by the application program. The address presented by the application program for the data is an address which presumes that the output display for that particular program is presented in a particular format. The address probably also presumes that in that particular format the output display for that particular program will occupy the entire screen. For this purpose, the application program presumes that the display is of a particular standard format and size, the information describing which is held in memory. For example, if the program is one normally presented in an IBM personal computer format, the application program may expect its output to be displayed in the VGA format of 640×480 pixels or in some other standard IBM PC format. Thus, the application program expecting its output to be presented on a computer output display in this format furnishes addresses for its graphics data which would place the data in the proper position on such a VGA display were the application program to utilize the entire display. When a window management program such as Microsoft Windows, manufactured and sold by-Microsoft Corporation, is used in a VGA display system to control a VGA display, then the addresses for the application program need only be translated by the window management program into addresses which place the data in the correct screen positions within the window.

However, if the program is actually being presented on a computer system having a different larger display format (e.g., one displaying 1152×1024 pixels), then the addresses for the data on the display must first be translated by the window management program into the same format as that used by the display. In addition to being translated into addresses in the format of the display, the addresses must also be translated into addresses which place the data into the correct screen positions within the window. If an address is in a position on the output display which is covered by a program being displayed in another window, the window management program must determine this and make sure that the data does not overwrite the data in the other window.

However, if an application program is to write directly to the frame buffer and bypass the window management program, then the application program (or some associated program). must translate addresses as necessary (because of a difference in the formats) to place the application program output in the correct position within a window, and must somehow communicate with the window management program so that it does not interfere with windows from other application programs being displayed under control of the window management program.

FIG. 1 is a block diagram which illustrates a portion of a computer system 10 of the prior art. The system 10 includes a primary central processing unit 12 which runs a primary operating system. The operating system includes a window management program which controls the data written to a frame buffer 14 for display on an output display device 15.

The system 10 may be adapted to run application programs in a plurality of operating system environments. For example, an Intel 80386 microprocessor is capable of running Unix as a primary operating system and simultaneously running MS DOS applications as windows on the output display. Discussion of an arrangement for presenting application programs in multiple formats through a window management program using a single processor is contained in an article entitled "DOS on the Sun 386i," published by Sun Microsystems in 1988 in *Sun Technology,* In such an arrangement, the processor 12 runs as a part of its primary operating system a monitor program which in turn runs individual virtual MS DOS machines. The monitor program is especially designed to allow the virtual machines to run in association with the processor 12. In effect, the program is specially written to intercept and trap the output signals from the virtual machines and translate those output signals to signals which may be interpreted by the primary operating system as though they were typical control signals furnished by an application program running on the primary operating system.

In order to make use of the,graphics output provided by the virtual MS DOS machines, the system 10 includes emulation circuitry 19 which emulates the graphics controller used in a typical IBM format computer. The emulation circuitry 19 allows the processor 12 and the DOS operating system to treat the output from the DOS application programs designed for the IBM PC format as it would be treated by a typical IBM personal computer and to furnish the results of those programs provided by the emulation circuitry 19 to the window management program of the primary operating system running on the processor 12 so that it may display those results in a window on the output display 15. To accomplish this, the emulation circuitry 19 may include the elements of a typical VGA graphics controller and its display memory, a number of which are well known in the prior art.

The primary operating system directs all data to be presented on the display 15 to its window management program, and the window management program controls all elements of the display 15. The output to be displayed by the application program being run on the virtual DOS machines by the processor 12 is, therefore, presented by the emulation circuitry 19 to the windows management program of the primary operating system for display. The windows management program directs the data to a portion of memory where it is stored awaiting display. The window management program sets up an area of the display as a window into which the application program is to be written; determines which, if any, overlaps with other windows are present; and ultimately writes the information from the memory, doing whatever address translation is necessary to present the pixels in the correct places in the window on the display 15.

However, because the windows management program must do this same thing for all of the application programs being displayed, it is capable of updating the frame buffer 14 at most only about ten times per second. The application programs in the IBM format and information such as live video and animation from other sources, on the other hand, are structured to write directly to a frame buffer and expect to be able to update the frame buffer as often as thirty times per second. If the programs of IBM format which run on the virtual machines by the processor 12 must go through the window management program of the system 10, their output appears sluggish in operation. Some programs which require very rapid updating of the frame buffer cannot be run satisfactorily through the window management program at all. For this reason, improvements to the system 10 have been devised in accordance with the present invention which allow the application programs run in the secondary format to be written directly to the frame buffer 14.

Figure 2:
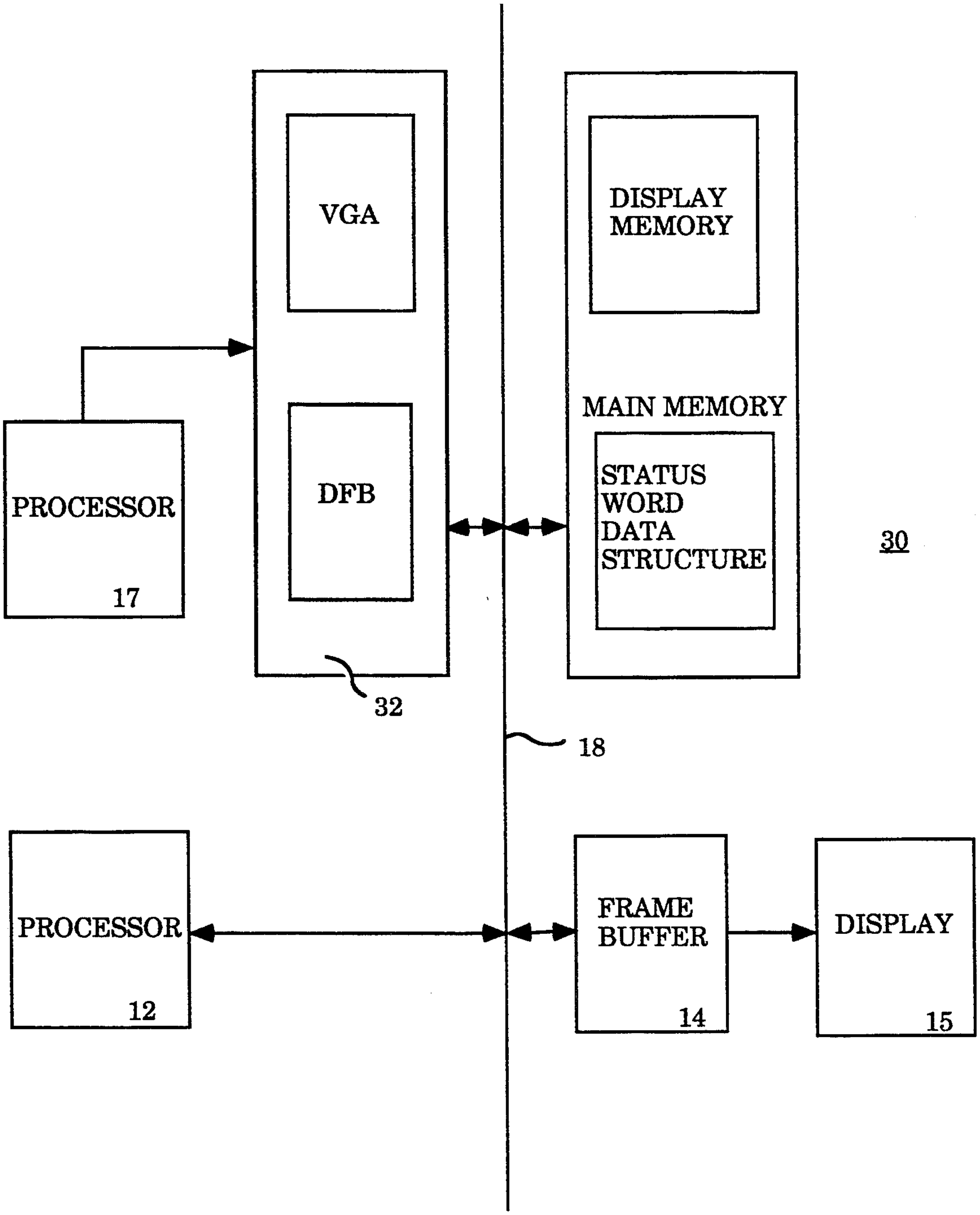
FIG. 2 is a block diagram of a computer system constructed in accordance with the present invention.

These improvements are illustrated in the circuit 30 of FIG. 2. FIG. 2 is a block diagram which illustrates a portion of a computer system 30 of the present invention. The system 30 includes a primary central processing unit 12 which runs a primary operating system. The operating system includes a window management program which controls the data written to a frame buffer 14 for display on an output display device 15. An exemplary system 30 might be one of the Sun SPARC workstations, manufactured by Sun Microsystems, Mountain View, Calif., which has an operating system that includes a window management program for controlling the data written to the output display.

The system 30 may be adapted to include as a portion thereof a second processor 17 such as the i486 processor manufactured by Intel Corporation, Santa Clara, Calif. The processor 17 is joined to the processor 12 by a bus 18 and emulation circuitry 32 which allows the transfer of information therebetween. The processor 17 is arranged to run a secondary operating system (such as MS DOS) which controls its operations. The operating system used by the processor 12 may include an SDOS kernel (driver) which is a program especially designed to allow the second processor 17 to run in association with the processor 12. In effect, the SDOS kernel is a program specially written to intercept and trap the output signals from the processor 17 and translate those output signals provided on the bus 18 to signals which may be interpreted by the SunOS operating system. For example, certain of the signals may be made to appear to the SunOS operating system as though they were typical control signals furnished by an application program running on the SunOS operating system. Also included is emulation circuitry 32 which emulates the graphics controller used in a typical IBM format computer. The emulation circuitry 32 allows the processor 17 and its DOS operating system to run application programs designed for the IBM PC format and to furnish the results of those programs to the window management program of the operating system running on the processor 12 so that it may display those results in a window on the output display 15. The emulation circuitry 32 may include the elements of a typical VGA graphics controller . As pointed out above, the second processor 17 might be replaced by circuitry for presenting live video or animation for display or by some other source of graphics information which for some reason it is desired to write directly to the output display.

AS in the prior art system discussed above, the basic SunOS operating system directs all data to be presented on the display 15 to its window management program, and the window management program controls all elements of the display 15. In order to allow the IBM or other format programs to write directly to the frame buffer 14, there are at least two major problems which must be solved. First, the processor 17 in writing data which is to be displayed furnishes addresses for that data which are chosen to present the data at the correct position on an output display which is of some standard IBM format or other format which is not the format used by the operating system. For the purpose of this description, it will be presumed that the format which the graphics information is furnished is the VGA format of 640×480 pixels; it might be any other display format, and a number of formats may all be used in accordance this invention. On the other hand, the output display is presumed to be in some Sun format which might display, for example, 1152×1024 pixels. The output of the application program is to be displayed in a window of the display 15 presenting that Sun format. Consequently, a system 30 for accomplishing this must provide some means for converting the pixel addresses presented in an IBM format to pixel addresses within a window in a Sun format. This is accomplished in the present invention by circuitry in an emulation module 32 and software which augments the functionality of the window management address translation system of the Sun OS system.

The particulars of conversion from the IBM format VGA addresses to SunOS operating system display addresses are well known. As pointed out, this conversion is normally handled by the window management program of the Sun OS operating system. Basically, the VGA addresses provided by the processor 17 are linear addresses in a format in which each address is represented by a value $(640\times X)+Y$, where X is the horizontal row of the display and Y is the vertical column of the display at which a pixel is to appear in the particular IBM format. Each such address is converted to a display address $(1152\times X')+Y'$ where $X'$ is the horizontal row of the display and $Y'$ is the vertical column of the display at which a pixel is to appear in the Sun format. This address is also offset, however, by additional $X'$ and $Y'$ values which position the window on the output display of the system 30. As pointed out, the conversion process is well known and is not by itself the subject of this invention.

For the particular example given here of an IBM format program, a peculiarity of the VGA format must also be handled by the conversion circuitry used in the emulation arrangement. In various presentation modes of the VGA format (and other IBM format programs), a single address and data are provided for only the first of eight linear addresses at which pixels are to be placed. In the IBM format program, the address is the first address for eight sequential pixels. The data in the IBM format program appears as a single byte of information which is sufficient using the various translation techniques available to furnish pixel values for the eight sequential pixels addressed. When the single address is converted, it represents the actual address of only the first pixel of the eight and must be incremented to provide the addresses of the following seven pixels in the sequence.

Meanwhile, the data representing the eight pixel coded in the single byte associated with the address are converted by the emulation circuitry to eight four-bit pixel values (this is typical of the VGA format), one representing each of the pixels in the sequence of eight pixels having the same starting address. These eight four-bit values must then be converted by means of a color lookup table to an eight bit value (which is the normal value used in the Sun system), and each eight bit pixel be written to the frame buffer as the addresses in the sequence are counted out.

In other modes of the VGA format, eight bits of data and a single address represent a single pixel on the display. This format must also be presented on the display.

All of the foregoing are typical translations of IBM format to Sun format in order that the information may be presented on a Sun display controlled by a windows management program of the SunOS operating system. The translation mechanism is merely moved to emulation circuitry 32 and software running on the processor 17. However, because the conversion of addresses takes a substantial period of time wherever it is done, the SDOS driver of the present invention is used to accomplish the translation of addresses from one format to another before any individual translation is required. Essentially, the processor 17 runs the SDOS driver software (this driver which communicates between the two systems could also be run by the processor 12) which receives information regarding the window to be displayed (including how it is to be clipped) from the window management program. The SDOS driver creates a data structure in memory in which the address conversion of each VGA address to a display address has already been accomplished. This data structure includes a status word for each pixel address (every eighth address when eight pixels are included with a single address) within the window provided by the window management program. Each status word includes an address within the window for each VGA address which may be furnished by the application program. Each VGA address provided by the processor 17 points to a status word in the data structure. The status word includes a frame buffer address already converted to place the pixel at the appropriate display address within the window using the standard conversion formulae. Consequently no time consuming conversion needs to occur when each VGA address is presented by the processor 17; merely a simple lookup needs to be accomplished.

Figure 3:
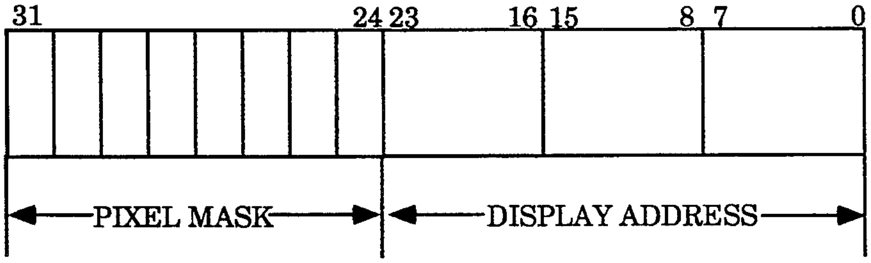
FIG. 3 represents a format used in a status word used in the present invention.

In the preferred embodiment of the invention, the status word consists of thirty-two bits. A representation of such a status word is shown in FIG. 3. Twenty-four of these bits are used for the frame buffer address, and eight bits represent masking values for the eight pixels represented by the address in the typical VGA format. Thus, a one in a mask bit position representing a pixel may indicate that a particular pixel is masked (obscured) by the data presented within another window on the display while a zero may indicate that the particular pixel represented by the bit is to be written to the frame buffer. In this manner the overlapping of windows on the display may be controlled.

Figure 4:
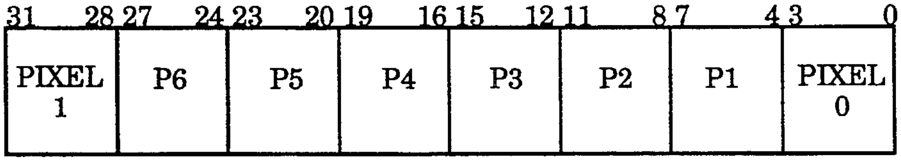
FIG. 4 illustrates the manner in which data for eight four-bit pixels is stored in a system utilizing the invention.

When writing directly to the frame buffer, an IBM format address is provided for eight sequential pixels by the processor 17. Along with the address, a data byte representing the information for each of the eight sequential pixels is provided. The data is converted by the VGA emulation circuitry 32 into eight four-bit pixel representations (see FIG. 4), and the address is converted by the emulation circuitry 32 using the data structure to the address indicated by the appropriate status word (FIG. 3) for the first of the pixels. With the address, the status word furnishes the eight bits of masking information for the eight pixels. The first pixel position in the frame buffer 15 is addressed, and the first four bits representing a pixel are converted to an eight bit pixel value. If the mask bit is a zero, the data is written to the pixel address in the frame buffer. The converted frame buffer address is then incremented by one, and the second four bits of data are converted to an eight bit pixel value. If the second mask bit is a zero, the data is written to the incremented address in the frame buffer. If either mask bit is a one, the data is obscured by another window and is not written to the frame buffer. This process continues through the sequence until the eight pixels are exhausted, and another address and its associated data are furnished by the processor 17.

It will be recognized that the use of a data structure as described in this specification allows the very rapid translation of addresses from one format to another because it does not require that the translation formulae be applied to each pixel as it is furnished by the processor 17. Moreover, the data structure allows any of the IBM formats (or formats of whatever computer display system is producing the addresses) to be translated by simply selecting the appropriate formulae for the particular translation. If the particular application program is producing addresses in CGA format rather than the VGA format, then only 320 pixels occur on a line of the display and only 200 lines appear on the display. A set of formulae for this translation is selected in initializing the emulation module 32 for the particular application program and when the data structure is created by the SDOD driver, these formulae are used to provide the status words.

An additional advantage of the translation accomplished by the present invention is that a data structure may be created and stored in memory for each individual application program being run on the processor 17. In this manner, all of the IBM format programs may be written directly to the frame buffer 14. However, the data structures by themselves only solve one part of the problem, how to accomplish the translation of addresses rapidly. They do, however, provide the vehicle for solving the second part of the problem, how to keep the application programs in IBM format from interfering with each other and the other programs on the display 15.

It will be recognized that by placing the masking bits for each of the eight sequential pixels with the address for the first of those pixels in each status word, all of the necessary elements to allow the IBM format program to cooperate with the other elements of the screen display are provided. This is true so long as the window position of the IBM format program does not change and no other window moves to obscure it or to remove obscuring pixels. When these things happen, the data structure must be reconstructed to change the converted addresses held in the status words (and possibly the masking bits if the window moves) or to change the masking bits if some other window moves and changes the clipping necessary. It will be appreciated that the reconstruction of the data structure requires cooperation with the window management program of the operating system.

As pointed out above, the SDOS driver is constructed so that the SunOS operating system and its window management program treat the IBM format program running on the processor 17 as merely another application program accessing the output display through the window management program. In order to accomplish this, the SDOS driver (the SDOS kernel) responds to the window management program in the same manner as would an application program so that the window management program of the SunOS operating system is in complete control of the placement of windows on the output display. When the processor 17 signals that it has an IBM format program which it wishes to run in a window, the window management program sets up and assigns the window structure to the IBM format program.

The window management program keeps track of the window structure assigned to the IBM format program in the same way it keeps track of all other window structures assigned to other programs. The window management program signals the SDOS driver running on the processor 17 that the window has been set up, and furnishes the emulator module 32 the details of its window including the portions of the window which are to be clipped. The SDOS driver uses this information to build the data structure for the area assigned for the window and stores that data structure in memory. The processor 17 then starts to transfer the VGA addresses and associated data to what it believes is VGA controller memory addresses. In fact, the VGA addresses are translated by the emulator module 32 to frame buffer addresses; and the emulator module 32 starts transferring the IBM format program data (translated to eight bit data by the standard conversion process) to the addresses specified by the status words of the data structure.

Not only is each pixel transferred to the frame buffer 14 in the manner described above, but a separate set of data and addresses representing each pixel is sent at the same time (or earlier in the preferred embodiment) to be stored in an area in shared memory reserved for the IBM format program. The pixel data is always written to this shared memory regardless of the contents of the mask in the data structure. In the preferred embodiment of the invention, this shared memory stores the pixels in the four bit per pixel VGA format discussed earlier and illustrated in FIG. 4. This separate block of memory allows the IBM format program to accomplish read/-modify/write operations on the data to be displayed. It is also used by the SDOS driver to help reconstruct the graphics data displayed in a window when that window is mowed to a new position on the output display.

In the meantime, the window management program monitors the entire window structure including the portions of windows which overlap one another and indicates when the data structure of the present invention needs to be updated. Whenever any window is moved, the window management program consults the overall window control structure it has created. If the window in which the IBM format program is running is involved in the window movement, the window management program sends a signal to the driver working with the emulator module 32 running the IBM format program. This signal cuts off the operation by which the IBM format program writes directly to the frame buffer and to the shared memory. The window management program then assigns the new window structure and informs the emulator module 32, providing information regarding the position and clipping. Given the new window positions, the SDOS driver reconstructs the data structure for the IBM format program so that the window addresses are correct and so that the masking bits for each sequence of pixels associated with each address are correct. When the window movement is completed, the window management program signals the driver running on the processor 17, and the emulator module 32 then signals the IBM format program to begin writing to the frame buffer again.

Figure 5:
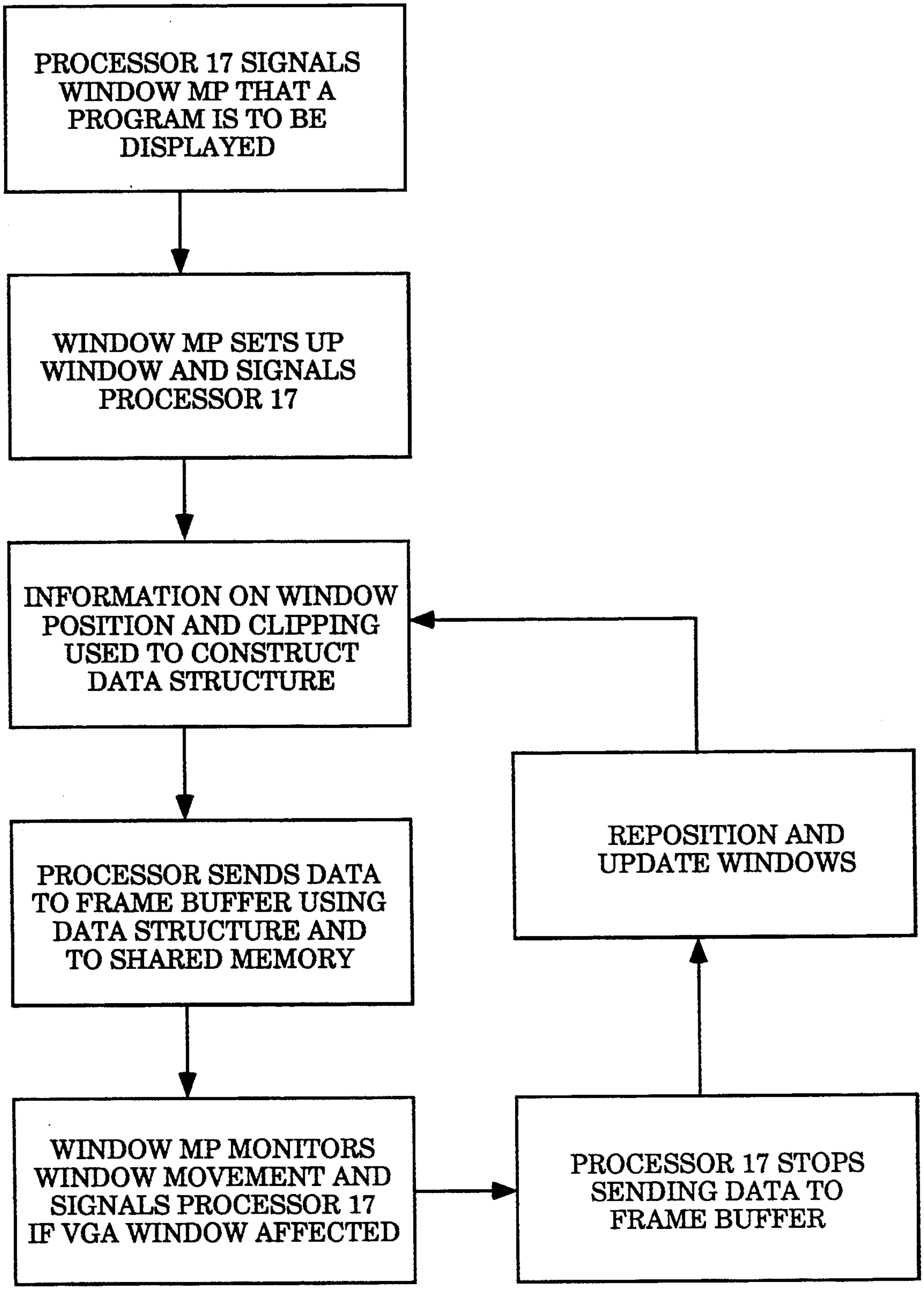
FIG. 5 is a flow chart describing the method of the invention.

FIG. 5 is a flow chart describing the operation of the system 30 in writing an IBM format program directly to the frame buffer 14 from the processor 17. As may be seen, the SDOS driver running on the processor 17 signals the windows management program that an IBM format program is to be displayed, 100. The windows management program sets up the window and signals the driver the position of and the clipping in the window, 102. The SDOS driver constructs the data structure including the status words for accomplishing the address translations into the format being displayed, 104. The emulator module 32 signals the processor 12, and the processor 12 sends addresses and data in IBM format for display, 106. The data is translated in accordance with the particular IBM format into pixel data. The addresses and data are sent to the windows management program for storage in shared memory and to the data structure for translation to addresses in display format. When translated, the data is written directly to translated addresses of the frame buffer 14 for display.

If the window into which the IBM format application program is being written is affected in some way by window movement (either of that window or another window), the window management program signals the driver running on the processor 17, at step 108. The driver stops the use of the data structure for address translation and the transfer of data to the shared memory, 110. The windows management program then repositions the particular window and updates its windows control structure 112, the provides information to the driver regarding the window position and clipping, 104. The SDOS driver reconstructs the data structure, signals the processor 17, and begins translating addresses uses the new data structure.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for writing directly to a frame buffer providing signals to an output display in a computer system having a processor running a window management program controlling the furnishing of data to the frame buffer and having a source of graphics data for display on the output display, said method comprising the steps of:

providing a signal from the source of graphics data to the processor indicating that graphics data from the source is to be displayed;

setting up a window for the display of the graphics data from the source under control of the window management program;

transmitting a signal from the processor to the source of graphics data indicating that the window exists, said signal providing information regarding position and clipping attributes of the window;

setting up a data structure for the window, said data structure including frame buffer address and clipping data corresponding to each output address of the graphics data; and transferring the graphics data from the source to addresses in the frame buffer pointed to by the addresses in the data structure, whereby the window management program is bypassed during the transferring of the graphics data to the frame buffer.

2. A method for writing directly to a frame buffer as claimed in claim 1 further comprising the steps of:

suspending the step of transferring graphics data from the source to the frame buffer when the window for the display of the graphics data from the source under control of the window management program is reconstructing the data structure to reflect the modified window; and restarting the transfer of graphics data from the source to address in the frame buffer pointed to by the addresses in the reconstructed data structure.

3. A method for writing directly to a frame buffer as claimed in claim 1 in which the step of setting up a data structure comprises:

generating a data word comprising the frame buffer address and masking bits for any data to be stored at the address indicating whether the data is to be displayed or not.

4. A method for writing directly to a frame buffer as claimed in claim 3 in which the step of generating a data word comprises:

generating a single masking bit for each address to which data is to be written.

5. A method for writing directly to a frame buffer as claimed in claim 1 further comprising the step of:

writing the graphics data to a memory shared by the processor and the source of graphics data.

6. A method for writing directly to a frame buffer as claimed in claim 1, wherein said source of graphics data comprises a second processor running application programs in a second format for display.

7. Apparatus for writing directly to a frame buffer providing signals to an output display in a computer system having a processor running a window management program controlling the furnishing of data to the frame buffer and having a source of graphics data for display on the output display, said apparatus comprising:

means for providing a signal from the processor to the source of graphics data indicating that graphics data from the source is to be displayed;

means for setting up a window for the display of the graphics data from the source under control of the window management program;

means for transmitting a signal from the processor to the source of graphics data indicating that the window exists, said signal providing information regarding position and clipping attributes of the window;

means for setting up a data structure for the window, said data structure including a frame buffer address and clipping data corresponding to each output address of the source of graphics data; and means for transferring the graphics data from the source to addresses in the frame buffer pointed to by the addresses in the data structure, whereby the window management program is bypassed during the transferring of the graphics data to the frame buffer.

8. Apparatus for writing directly to a frame buffer as claimed in claim 7 further comprising:

means for suspending operation of the means for transferring graphics data from the graphics source to the frame buffer when the window for the display of the graphics data from the source under control of the window management program is modified;

means for reconstructing the data structure to reflect the way in which the window is modified; and means for restarting the transfer of graphics data from the source to addresses in the frame buffer pointed to by the addresses in the reconstructed data structure.

9. Apparatus for writing directly to a frame buffer as claimed in claim 7 in which means for setting up a data structure for the window including a frame buffer address and clipping data for each address to be generated for displaying the graphics data furnished by the source in the window constructed comprises:

means for generating a data word comprising the frame buffer address and masking bits for any data to be stored at the address indicating whether the data is to be displayed or not.

10. Apparatus for writing directly to a frame buffer as claimed in claim 9 in which the means for generating a data word comprising the frame buffer address and masking bits for any data to be stored at the address indicating whether the data is to be displayed or not comprises means for generating a single masking bit for each address to which data is to be written,

11. Apparatus for writing directly to a frame buffer as claimed in claim 7 further comprising means for writing the graphics data from the source to memory to a memory shared by the processor and the source of graphics data.

12. Apparatus for writing directly to a frame buffer as claimed in claim 7 in which the source of graphics data comprises an application program running on a second processor.

13. In a computer system having a processor running a window management program and controlling the furnishing of display data to a frame buffer for subsequent display on an output display, wherein said system further includes a source of graphics data for display on said output display and a memory connected to said source of graphics data, a method for writing said graphics data directly to said frame buffer whereby the window management program is bypassed during the writing of graphics data, said method comprising the steps of:

providing a signal from the source of graphics data to the window management program indicating that graphics data from the source is to be displayed;

controlling the processor to set up a window within said frame buffer for display of the graphics data;

providing a signal from the window management program to the source of graphics data to provide window attribute information;

transmitting information representative of said window from said processor to said source of graphics data, said information including position attributes of said window;

creating a data structure in said memory of said source, said data structure storing a plurality of pointers, each pointer identifying a frame buffer address for a corresponding output address of said graphics source; and transferring data from said graphics source to addresses in said frame buffer identified by said pointers.

14. The method of claim 13, wherein said step of transmitting said information representative of said window additionally includes the step of transmitting clipping attributes of said window;

said step of creating said data structure additionally includes the step of storing clipping data for each output address of said graphics source, with said clipping data designating whether said frame buffer address corresponding to said graphics source output address is to be displayed; and said step of transferring data from said graphics source to said frame buffer includes the step of examining said clipping data for all graphics data output from said graphics source to determine a portion of the graphics data to be displayed and transferring only said portion of graphics data to said frame buffer.

15. The method of claim 13, further comprising the steps of:

transmitting new information representative of said window from said processor to said graphics source if said window is modified;

suspending the step of transferring data from said graphics source to said frame buffer when said new information representative of said window is received by said graphics source;

reconstructing said data structure using said new information for said modified window; and resuming transferring of data from said graphics source to said frame buffer using said restructured data structure.

16. In a computer system having a processor running a window management program, wherein said processor controls the furnishing of data to a frame buffer for subsequent display on an output display, and wherein said system further includes a source of graphics data for display on said output display, and a memory connected to said source of graphics data, a method for writing said graphics data directly to said frame buffer whereby the windows management program is bypassed during the writing of graphics data, said method comprising the steps of:

providing a signal from the source of graphics data to the window management program indicating that graphics data from the source is to be displayed;

controlling the processor to set up a window within said frame buffer for display of the graphics data;

providing a signal from the window management program into the source of graphics data to provide window attribute information;

transmitting information representative of said window from said processor to said source of graphics data, said information including position and clipping attributes of said window;

creating a data structure in said memory of said source, said data structure storing a plurality of pointers, each pointer identifying a frame buffer address for a corresponding output address of said graphics source, said data structure additionally storing clipping data for each output address of said graphics source, with said clipping data designating whether said frame buffer address corresponding to said graphics source output address is to be displayed;

transferring data from said graphics source to addresses in said frame buffer identified by said pointers;

transmitting new information representative of said window from said processor to said graphics source if said window is modified;

suspending the step of transferring data from said graphics source to said frame buffer when said new information representative of said window is received by said graphics source;

reconstructing said data structure using said new information for said modified window; and resuming transferring of data from said graphics source to said frame buffer using said restructured data structure.

17. In a computer system having a processor running a window management program and controlling the furnishing of display data to a frame buffer for subsequent display on an output display, wherein said system further includes a source of graphics data for display on said output display and a memory connected to said source of graphics data, an apparatus for writing said graphics data directly to said frame buffer whereby the window management program is bypassed during the writing of graphic data, said apparatus comprising:

means for providing a signal from the source of graphics data to the window management program indicating that graphics data from the source is to be displayed;

means for setting up a window within said frame buffer for display of the graphics data;

means for providing a signal from the window management program to the source of graphics data to provide window attribute information;

means for transmitting information representative of said window from said processor to said source of graphics data, said information including position attributes of said window;

means for creating a data structure in said memory of said source, said data structure storing a plurality of pointers, each pointer identifying a frame buffer address for a corresponding output address of said graphics source; and means for transferring data from said graphics source to addresses in said frame buffer identified by said pointers.

18. The apparatus of claim 17, wherein:

said means for transmitting said information representative of said window additionally includes means for transmitting clipping attributes of said window;

said means for creating said data structure additionally includes the means for storing clipping data for each output address of said graphics source, with said clipping data designating whether said frame buffer address corresponding to said graphics source output address is to be displayed; and said means for transferring data from said graphics source to said frame buffer includes the step of examining said clipping data for all graphics data output from said graphics source to determine a portion of the graphics data to be displayed and transferring only said portion of graphics data to said frame buffer.

19. The apparatus of claim 17, further comprising:

means for transmitting new information representative of said window from said processor to said graphics source, if said window is modified;

means for suspending the step of transferring data from said graphics source to said frame buffer when said new information representative of said window is received by said graphics source;

means for reconstructing said data structure using said new information for said modified window; and means for resuming transferring of data from said graphics source to said frame buffer using said restructured data structure.

20. An apparatus for writing graphics data from a graphics source to a frame buffer for subsequent display on an output display, said apparatus comprising:

a processor for running a window management program and for controlling the furnishing of display data to the frame buffer, said processor setting up a window within said frame buffer, in response to a request received from the graphics source, for display of the graphics data and transmitting information representative of said window to the source of graphics data, said information including position attributes of said window;

a memory, connected to the graphics source, for storing a plurality of pointers forming a data structure, each pointer identifying a frame buffer address for a corresponding output address of said graphics source; and a data bus, for transmitting graphics data from said graphics source to addresses in said frame buffer identified by said pointers within said data structure, whereby the window management program is bypassed during the transmission of the graphics data.

21. In a computer system having a processor running a window management program controlling the furnishing of display data to the frame buffer, a method for allowing a computer program not capable of running under the window management program to display graphics data by writing directly to the frame buffer, said method comprising the steps of:

providing a signal from the computer program to the window management program, said signal indicating that graphics data from the computer program is to be displayed;

controlling the window management program to set up a window for the display of the graphics data from the computer program;

transmitting a signal from the window management program to the computer program indicating that the window exists, said signal providing information regarding position and clipping attributes of the window;

setting up a data structure for the window, said data structure including a frame buffer address and clipping data corresponding to each output address of the graphics data; and transferring the graphics data from the computer program to addresses in the frame buffer pointed to by the addresses in the data structure.

22. The method of claim 21, wherein the computer program providing the graphics data is running on the processor.

23. The method of claim 20, wherein the computer program providing the graphics data is running on a second processor.

24. In a computer system having a processor running a window management program controlling the furnishing of display data to the frame buffer, an apparatus for allowing a computer program not capable of running under the window management program to display graphics data by writing directly to the frame buffer, said apparatus comprising:

means for providing a signal from the computer program to the window management program, said signal indicating that graphics data from the computer program is to be displayed;

means for controlling the window management program to set up a window for the display of the graphics data from the computer program;

means for transmitting a signal from the window management program to the computer program indicating that the window exists, said signal providing information regarding position and clipping attributes of the window;

means for setting up a data structure for the window, said data structure including a frame buffer address and clipping data corresponding to each output address of the graphics data; and means for transferring the graphics data from the computer program to addresses in the frame buffer pointed to by the addresses in the data structure.

25. The method of claim 24, wherein the computer program providing the graphics data is running on the processor.

26. The method of claim 24, wherein the computer program providing the graphics data is running on a second processor.

* * * * *

UNITED STATES PATENT AND TRADEMARK OFFICE
CERTIFICATE OF CORRECTION

PATENT NO. : 5,388,200
DATED : February 7, 1995
INVENTOR(S) : McDonald et al.

It is certified that error appears in the above-identified patent and that said Letters Patent is hereby corrected as shown below:

In column 12 at line 9, please delete " frame " and insert -- a frame --.

In column 14, claim 16 at line 61, please delete " into " and insert -- to --.

In column 17, claim 23 at line 5, please delete " 20 " and insert -- 21 --.

Signed and Sealed this

Second Day of February, 1999

Attest:

Attesting Officer

*Acting Commissioner of Patents and Trademarks*